United States Patent [19]

Miyakawa

[11] 4,007,466
[45] Feb. 8, 1977

[54] ELECTRICAL SYSTEM HAVING A PHOTOELECTRIC CONVERTER TO BE USED IN PHOTOGRAPHY

[75] Inventor: Seinan Miyakawa, Tokyo, Japan

[73] Assignee: Asahi Kogaku Kogyo Kabushiki Kaisha, Japan

[22] Filed: Feb. 3, 1975

[21] Appl. No.: 546,563

[30] Foreign Application Priority Data

Feb. 4, 1974 Japan ............................ 49-13656

[52] U.S. Cl. ................................ 354/24; 354/50; 354/51; 354/60 R; 354/60 E
[51] Int. Cl.² .......................................... G03B 7/08
[58] Field of Search ............... 354/51, 60 R, 60 E, 354/50, 24

[56] References Cited

UNITED STATES PATENTS

| | | | |
|---|---|---|---|
| 3,695,157 | 10/1972 | Miyakawa | 354/51 |
| 3,810,203 | 5/1974 | Movi et al. | 354/51 |
| 3,820,126 | 6/1974 | Haratake | 354/51 |
| 3,848,986 | 11/1974 | Miyakawa et al. | 354/51 |

*Primary Examiner*—Russell E. Adams, Jr.
*Attorney, Agent, or Firm*—Steinberg & Blake

[57] ABSTRACT

An electrical system to be used for photographic purposes. The electrical system has an input circuit for providing a given input signal as well as an output circuit for utilizing the latter signal and an intermediate circuit electrically connected between the input and output circuits for controlling the transmission of the input signal to the output circuit. The input circuit includes a photoelectric converter in the form of a semiconductor which receives light and which has an open-circuit voltage which varies in the manner of a logarithmic compression depending upon the intensity of the received light so that the input signal is determined at least in part by the nature of the light received by the photoelectric converter. The intermediate circuit is electrically connected with the input circuit for providing for the latter a stabilized circuit condition in which the photoelectric converter is in a stabilized state where no current flows therethrough.

9 Claims, 2 Drawing Figures

ELECTRICAL SYSTEM HAVING A PHOTOELECTRIC CONVERTER TO BE USED IN PHOTOGRAPHY

BACKGROUND OF THE INVENTION

The present invention relates to photography.

In particular, the present invention relates to devices such as cameras and exposure meters.

As is well known, devices of the above type operate in accordance with variable factors one of which is the intensity of light at a subject which is to be photographed. These devices have photoelectric converters to be used for controlling the operation of the shutter of a camera, for example. For this purpose photoelectric conversion information is obtained by utilizing a semiconductor element under conditions where a constant voltage is applied thereto so that there will be a resulting resistance corresponding to the intensity of light received by the semiconductor. With such an arrangement the photoelectric conversion information is obtained in the form of a voltage difference which develops across a predetermined resistor when an electric current flows through the resistor which is situated in an electrical circuit including either a single semiconductor element or a series of parallel circuit portions having therein a single semiconductor element and a resistor having a preselected suitable resistance. In conventional circuits of this type the semiconductor element has a photoelectric characteristic and is used as a passive element.

As a result, conventional circuits of the above type require a power source in order to obtain a photoelectric conversion. Such conventional circuitry has a low photoelectric conversion efficiency as a result of the power consumed by the resistor or resistors included in the circuit.

Accordingly, it is difficult to carry out photometric operations for a subject which has a low luminance. In addition there is a danger that the accuracy of the circuit calculation operations and the timing circuit operation for determining the exposure time, depending upon the photoelectric conversion output, is lowered as the power voltage is lowered.

SUMMARY OF THE INVENTION

It is accordingly a primary object of the present invention to provide circuitry which will avoid the above drawbacks.

In particular, it is an object of the present invention to provide a circuit which will enable the measurable range of subject luminance, particularly subject luminance in the low luminance region, to be spread considerably beyond what has heretofore been possible.

In particular, it is an object of the present invention to provide a circuitry of the above type according to which a photoelectric conversion means can achieve a stabilized state where no current will flow therethrough so that no power is consumed thereby once the stabilized state is reached.

Furthermore it is an object of the present invention to provide a circuit of the above type which is particularly adapted for use in a camera for automatically determining exposure time.

However, it is also an object of the present invention to provide circuitry of the above type which is capable of being effectively used in an exposure meter or in a circuitry which includes both an exposure meter and structure for automatically determining exposure time.

According to the invention the electrical system includes an input circuit means for providing an input signal, an output circuit means for providing an output determined at least in part by this input signal, an intermediate circuit means for controlling the transmission of the input signal to the output circuit means, this intermediate circuit means being electrically connected between the input circuit means and the output circuit means. The input circuit means includes a photoelectric conversion means for receiving light and having an open-circuit voltage which varies in accordance with the intensity of the received light, while the intermediate circuit means cooperates with the input circuit means to provide for the photoelectric conversion means a stabilized condition where no current flows therethrough.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
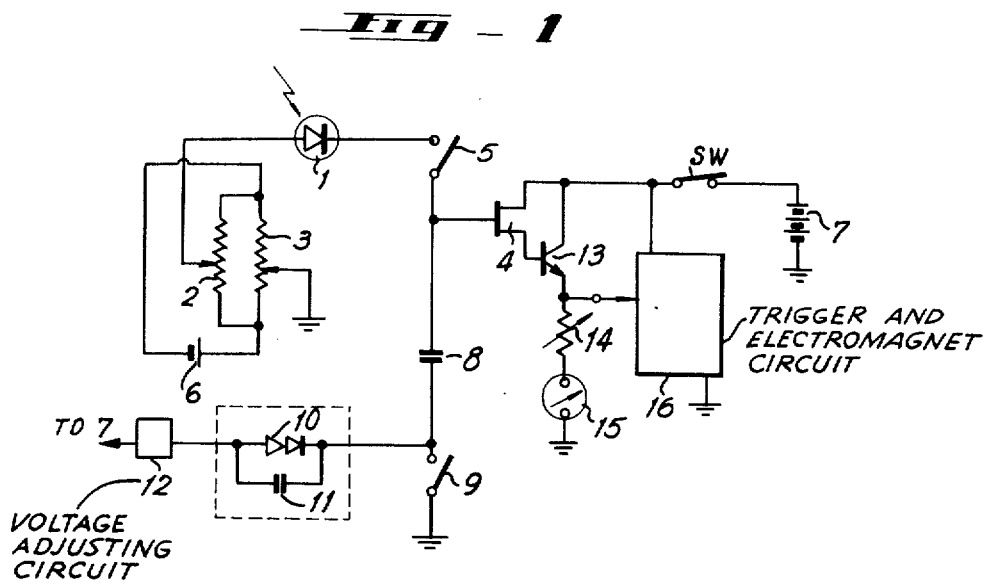
FIG. 1 is a wiring diagram of an electrical system according to the invention.

Referring now to FIG. 1, there is illustrated therein an electrical system according to the invention which is adapted to be used for controlling the operation of a shutter of a single lens reflex camera. The electrical circuitry of FIG. 1 includes an input circuit means shown in FIG. 1 to the left of a field effect transistor 4 which forms part of an intermediate circuit means. The input circuit means is in the form of a control circuit having a semiconductor element in the form of a photodiode 1 serving as a photoelectric conversion means which has a photoelectric conversion function. The photodiode 1 has a positive terminal connected to the output terminal of a calculation circuit means consisting of a pair of variable resistors 2 and 3 whose resistances are determined in accordance with a selected diaphragm aperture and in accordance with the sensitivity of the film which is exposed. The negative terminal of the photodiode 1 is electrically connected with the gate terminal of the field effect transistor 4 by way of a normally closed memory switch 5. The variable resistors 2 and 3 are connected in parallel with each other so as to form a potentiometer. The calculation circuit means which includes the variable resistors 2 and 3 also includes a power battery 6 which is connected across the opposite ends of the variable resistors 2 and 3. The output terminal for the partial voltage, at the sliding contact or element of the variable resistor 2 is connected with the photodiode 1, while the sliding contact of the variable resistor 3 is grounded.

Across the gate terminal of the field effect transistor 4 and ground (the negative terminal of the power battery 7 for the entire device) is arranged a series circuit made up of a memory capacitor 8 and a timing switch 9 which operates in a well known manner in synchronism with the shutter. To a junction between the memory capacitor 8 and the switch 9 is connected one end of an expansion circuit made up of a parallel-connected diode 10 and a capacitor 11. The opposite end of this latter parallel circuit is connected to the positive terminal of the battery 7 by way of a voltage adjusting circuit 12. This latter circuit 12 may have the same construction as the unit D shown in U.S. Pat. No. 3,820,126.

The drain and source terminals of the field effect transistor 4 are respectively connected to the collector and base terminals of a transistor 13 which also forms part of the intermediate circuit means. The emitter circuit of transistor 13 is electrically connected with an ammeter 15 by way of a sensitivity adjusting resistor 14. This ammeter 15 acts as a display means and enables the circuitry to operate as an exposure meter. The emitter output from the transistor 13 is also applied to a unit 16 which includes a conventional trigger circuit and electromagnetic mechanism for initiating a shutter-closing operation.

Figure 2:
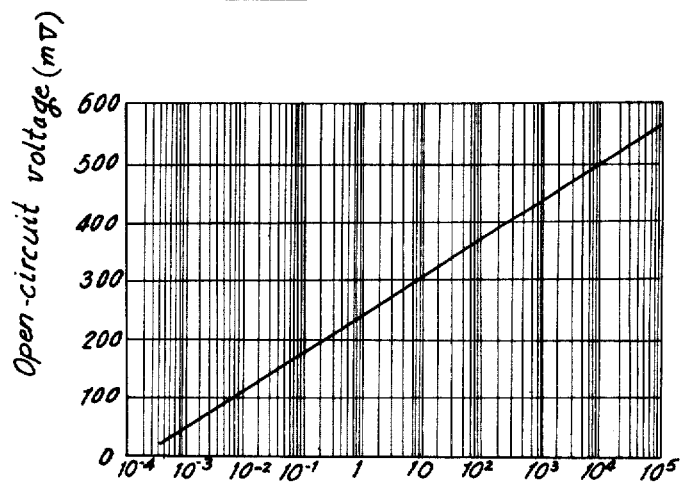
FIG. 2 is a graph illustrating the characteristics of a photoelectric conversion element utilized in the circuitry of FIG. 1.

The graph of FIG. 2 represents the characteristics of the photodiode 1. Thus it will be seen from FIG. 2 that the photodiode 1 has an open-circuit voltage (mV) shown at the ordinate while the intensity of the received light (lux) is represented at the abscissa. Thus it will be seen that the open-circuit voltage varies in the manner of a logarithmic compression linearly with variation in light intensity. The photodiode 1, may, for example, be a commercially available OMRON Model EE-D photodiode.

The above-described circuitry also includes a switch SW for energizing the entire circuit by connecting the battery 7 into or out of the circuit, as illustrated in FIG. 1.

When utilizing the electrical system of the invention as described above, the slide elements of the variable resistors 2 and 3 are moved to positions determined in accordance with the selected diaphragm aperture and the sensitivity of the film which is to be exposed, so as to determine in this way the resistance ratio of these variable resistors. Under these conditions a voltage corresponding to the result of the calculation of the factors of the diaphragm value and film sensitivity value is applied from the battery 6 to the photodiode 1. When the photodiode 1 receives light from the subject which is to be photographed, this photodiode 1 develops a photoelectric output which is dependent both upon the intensity of the received light and the photoelectric conversion characteristic of the photodiode 1, as illustrated in FIG. 2. Under conditions where the memory switch 5 and the timing switch 9 are both closed, the photoelectric output of the photodiode 1 is charged into the memory capacitor 8 as a transient phenomenon. Inasmuch as the circuit to which the input signal in the form of this photoelectric output is to be applied is a high input impedance circuit, upon completion of the charging operation the circuit is stabilized under conditions where the output voltage from the calculation circuit is added to the open-circuit voltage of the photodiode 1.

Moreover, due to the logarithmic compression effect at the PN-junction of the photodiode 1, the stable voltage under these conditions is equal to the arithmetic sum of a voltage which is proportional to the logarithmic value of the intensity of the received light and the output voltage of the calculation circuit which includes the variable resistors 2 and 3.

Just prior to opening of the shutter, the memory switch 5 is opened, assuming that the circuit is utilized in a single lens reflex camera, and then in synchronism with opening of the shutter the switch 9 is opened, so that subsequent to opening of the switches 5 and 9 the voltage across the terminals of the memory capacitor 8 will rise because of the output voltage derived from the expansion circuit made up of the diode 10 and capacitor 11. This variation in the voltage across the memory capacitor 8 is applied through the intermediate circuit means 4, 13 to the subsequent trigger circuit of unit 16 under the action of the low noise high power gain due to the high input impedance buffer amplifier consisting of the field effect transistor 4 and transistor 13. When the voltage variation reaches a predetermined trigger level of the trigger circuit, the trigger circuit deenergizes the electromagnet of the unit 16. Until this electromagnet is deenergized it prevents the shutter from closing. Thus, by way of the trigger circuit the electromagnet is deenergized to commence the closing of the shutter. In this way the exposure is terminated in accordance with an automatically determined exposure time. An arrangement of this latter type according to which an expansion circuit is connected through a capacitor with a trigger circuit to trigger the latter upon charging the capacitor to a given level is disclosed in U.S. Patent 3,848,986 which also explains how this part of the circuitry operates.

At the time prior to opening of the shutter when the memory switch 5 is in its closed position, the photoelectric conversion and calculation result which is memorized by the memory capacitor 8 can be read at the ammeter 15 which is electrically connected to the memory capacitor 8 by way of the buffer amplifier. Therefore, the photoelectric converter of the invention may readily be modified into an electrical exposure meter by omitting from the circuit of FIG. 1 the information memorizing section and shutter operation control section, or in other words by omitting from the circuitry such elements as the memory capacitor 8, the expansion circuit 10, 11, and the unit 16.

As is apparent from the above, with the system of the invention a photoelectric output element is utilized as a photoelectric conversion means and, in addition, the characteristics of this photoelectric conversion means is such that it serves as an active element. In other words, the open-circuit voltage of the photoelectric conversion means is variable depending upon the intensity of the received light and is directly utilized in determination of the input signal. Therefore, when the photoelectric conversion means is in a stabilized state as described above, no electrical current flows through the photoelectric conversion element 1, and therefore no electrical power is consumed thereby. As a result it is possible to utilize the photoelectric conversion means in the system of the invention for photometric operation seven under conditions where the conversion circuit has an extremely high conversion efficiency and the intensity of the received light is extremely low. Therefore, the photoelectric converter of the present invention, which has an excellent response characteristic as well as an excellent conversion characteristic having a high linearity over over a wide luminance range extending from extremely low to relatively high regions, can be used very effectively as a photoelectric conversion means in the control of a camera shutter applicable for such purposes as high shutter speed photography, microphotography, and telephotophotography.

It is to be noted that the photodiode 1 is shown connected in a forward direction in the illustrated circuitry of FIG. 1. It is also possible to connect the photodiode 1 into the circuit in a reverse direction, although under these latter conditions it cannot be expected that there will be the high accuracy achieved with the forward direction connection as described above. Nevertheless, the circuit may be used with the photoelectric conversion element connected into the circuit in the reverse direction.

What is claimed is:

1. In an electrical system at least part of which is capable of determining, according to the nature of light received by the system, a factor to be utilized in the exposure of photographic film, input circuit means for providing an input signal, output circuit means for providing an output determined at least in part by said input circuit means, and intermediate circuit means electrically connected between said input and output circuit means for controlling the transmission of said input signal to said output circuit means, said input circuit means including a photoelectric conversion means for receiving light and having an open-circuit voltage which is variable depending upon the intensity of the received light for providing by way of the latter voltage at least part of said input signal so that said input signal is determined at least in part by the intensity of the light received by said photoelectric conversion means, and said intermediate circuit means cooperating with said input circuit means for providing a stabilized circuit condition where said photoelectric conversion means is in a stabilized state with no electrical current flowing therethrough, said photoelectric conversion means including a photodiode having an open-circuit voltage characteristic which varies according to a logarithmic compression depending upon the intensity of the light received by said photodiode, and said photodiode having a pair of terminals one of which is electrically connected with said intermediate circuit means, a voltage source, and calculation circuit means for providing an electrical magnitude determined by a preselected diaphragm aperture and film sensitivity, said calculation circuit means being electrically connected only with said voltage source, with ground, and with the other of said pair of terminals of said photodiode, for combining said electrical magnitude with the voltage determined by said photodiode in accordance with light intensity, whereby said electrical magnitude is transmitted only through said photodiode to said intermediate circuit means with no electrical current flowing through said photodiode upon reaching said stabilized state.

2. The combination of claim 1 and wherein said intermediate circuit means includes a high input impedance buffer amplifier.

3. The combination of claim 2 and wherein said output circuit means includes a meter for indicating a value determined at least in part by said input signal so that the system can function as an exposure meter.

4. The combination of claim 2 and wherein said output circuit means includes a means for automatically terminating exposure of film in a camera after elapse of an exposure time determined at least in part by said input signal.

5. The combination of claim 4 and wherein said output circuit means also includes a meter for indicating a value determined at least in part by said input signal so that said output circuit means can also function in the manner of an exposure meter.

6. The combination of claim 1 and wherein said calculation circuit means includes a pair of parallel-connected variable resistors elctrically connected with said photodiode.

7. The combination of claim 6 and wherein said input circuit means includes as said voltage source a battery having terminals between which said parallel-connected variable resistors are connected with said resistors respectively having one sliding contact which is grounded and another sliding contact which is electrically connected to said photodiode.

8. The combination of claim 2 and wherein said intermediate circuit means includes a field effect transistor having a gate terminal connected with said photoelectric conversion means and a transistor having a collector and base respectively connected with drain and source terminals of said field effect transistor while having an emitter electrically connected to said output circuit means.

9. The combination of claim 8 and wherein a memory capacitor is also connected electrically with said gate terminal of said field effect transistor while a memory switch is connected between said photoelectric conversion means and said field effect transistor, a normally closed timing switch being electrically connected with said memory capacitor and with ground while an expansion circuit means is electrically connected to a junction between said memory capacitor and said timing switch, whereby said memory switch can be opened to retain at said memory capacitor a charge determined at least in part by said photoelectric conversion means while said timing switch can open in synchronism with the opening of a shutter of a camera, and said output circuit means including a means for terminating exposure of film in a camera after elapse of a given exposure time subsequent to opening of said timing switch and increase of the charge of said memory capacitor by said expansion circuit means, whereby the electrical system may be used in a single lens reflex camera for determining exposure time.

* * * * *